(12) United States Patent
Hinson et al.

(10) Patent No.: US 8,947,404 B2
(45) Date of Patent: Feb. 3, 2015

(54) STYLUS

(75) Inventors: Nigel Stephen Daniel Hinson, Hants (GB); Thomas Matthew Bell, Southampton (GB)

(73) Assignee: Atmel Corporation, San Jose, CA (US)

( * ) Notice: Subject to any disclaimer, the term of this patent is extended or adjusted under 35 U.S.C. 154(b) by 766 days.

(21) Appl. No.: 13/044,237

(22) Filed: Mar. 9, 2011

(65) Prior Publication Data

US 2012/0228039 A1 Sep. 13, 2012

(51) Int. Cl.
*G06F 3/033* (2013.01)
*G06F 3/0354* (2013.01)

(52) U.S. Cl.
CPC .................................. *G06F 3/03546* (2013.01)
USPC ........................................ 345/179; 178/19.03

(58) Field of Classification Search
None
See application file for complete search history.

(56) References Cited

U.S. PATENT DOCUMENTS

| | | | |
|---|---|---|---|
| 4,430,526 A * | 2/1984 | Brown et al. | 345/175 |
| 5,912,662 A * | 6/1999 | Bunn et al. | 345/179 |
| 6,801,211 B2 * | 10/2004 | Forsline et al. | 345/581 |
| 7,663,607 B2 | 2/2010 | Hotelling | |
| 7,875,814 B2 | 1/2011 | Chen et al. | |
| 7,920,129 B2 | 4/2011 | Hotelling | |
| 7,969,426 B2 * | 6/2011 | Skillman et al. | 345/175 |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 2002/0070927 A1 * | 6/2002 | Fujitsuka et al. | 345/179 |
| 2008/0297493 A1 * | 12/2008 | Adkins | 345/179 |
| 2009/0315854 A1 | 12/2009 | Matsuo | |
| 2010/0006350 A1 * | 1/2010 | Elias | 178/18.06 |
| 2012/0206419 A1 * | 8/2012 | Lee et al. | 345/179 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |

FOREIGN PATENT DOCUMENTS

| | | | |
|---|---|---|---|
| CN | 101526860 A | * | 9/2009 |
| CN | 101706694 A | * | 5/2010 |
| WO | WO 2012/129247 | | 9/2012 |

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Jason Olson
(74) *Attorney, Agent, or Firm* — Baker Botts LLP

(57) ABSTRACT

A stylus may have a flat portion on a movable tip at one end for contact with a flat surface, or a stylus may have movable pins adjustable in response to contact pressure for use with a non-flat surface.

19 Claims, 5 Drawing Sheets

STYLUS

BACKGROUND

A touch position sensor is a device that can detect the presence and location of a touch by a finger or by another object, such as a stylus. A touch position sensor, for example, can detect the presence and location of a touch within an area of an external interface of the touch position sensor. In a touch sensitive display application, the touch position sensor enables direct interaction with what is displayed on the screen, rather than indirectly with a mouse or touchpad.

There are a number of different types of touch position sensors, such as resistive touch screens, surface acoustic wave touch screens, capacitive touch screens etc. A capacitive touch screen, for example, may include an insulator, coated with a transparent conductor in a particular pattern. When an object, such as a finger or a stylus, touches or is provided in close proximity to the surface of the screen there is a change in capacitance. This change in capacitance may be sent to a controller for processing to determine the position of the touch.

As the technology of touch screens and the resolution available in portable interactive touch position sensors advances, at least some users may prefer to use a stylus. A stylus generally is linearly shaped and has a smaller contact area than a finger which may make it easier to differentiate between touch icons on a screen. In addition, a stylus may have a sensing tip of rounded design in order to avoid damaging the very sensitive surfaces of the screens.

However, a stylus having a rounded tip may have limited contact with the flat screen of a touch position sensor. As a result, the ability of the touch screen to sense the position of a stylus having a single, ball-shaped tip may be limited.

SUMMARY

A stylus may have a flat portion on a movable tip at one end for contact with a flat surface, or a stylus may have movable pins adjustable in response to contact pressure for use with a non-flat surface.

BRIEF DESCRIPTION OF THE FIGURES

The figures depict one or more implementations in accordance with the present teachings, by way of example, not by way of limitation. In the figures, like reference numerals refer to the same or similar elements.

DETAILED DESCRIPTION

In the following detailed description, numerous specific details are set forth by way of examples. In order to avoid unnecessarily obscuring examples of the present disclosure, those methods, procedures, components, and/or circuitry that are well-known to one of ordinary skill in the art have been described at a relatively high level.

Reference now is made in detail to the examples illustrated in the accompanying figures and discussed below.

Figure 1A:
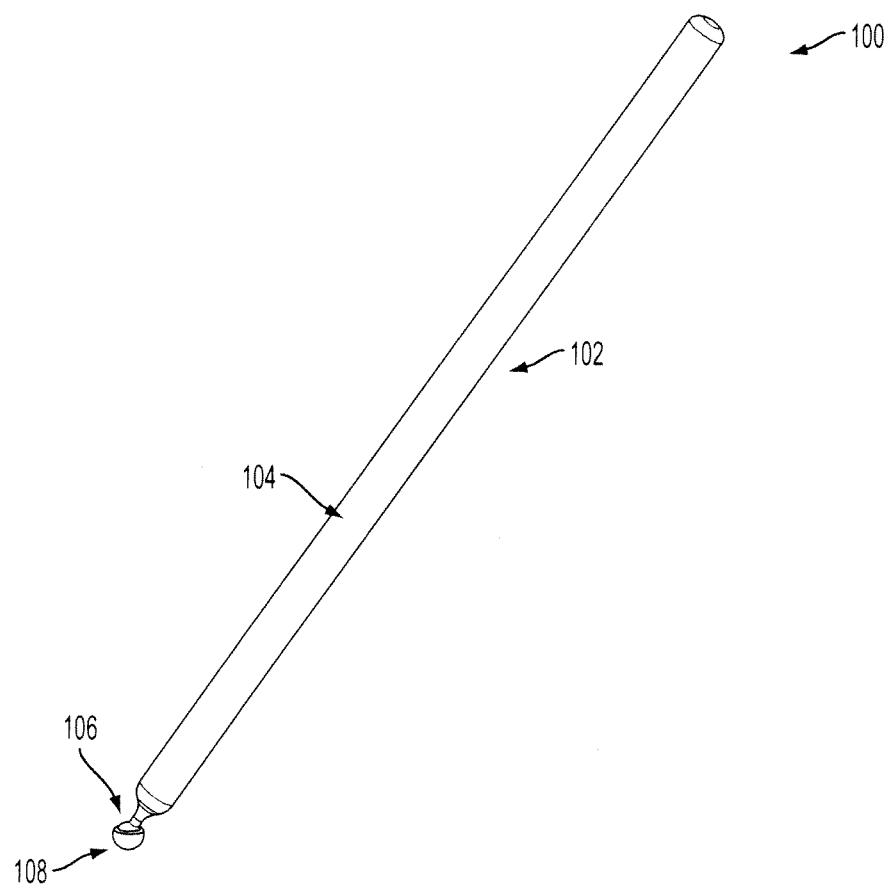
FIG. 1A is a schematic illustration of an exemplary stylus.

FIG. 1A illustrates an exemplary stylus 100 for a capacitive touch position sensor. The stylus 100 may have an elongated body 102, which may have a stem 104 and a head 106. A tip 108 may be provided on head 106. The stem 104 of the elongated body 102 is linear in the example, although curved or angled shapes may be used.

In use, the stem 104 may be held by a user such that the tip 108 may be brought into contact with a capacitive touch position sensor.

Figure 1B:
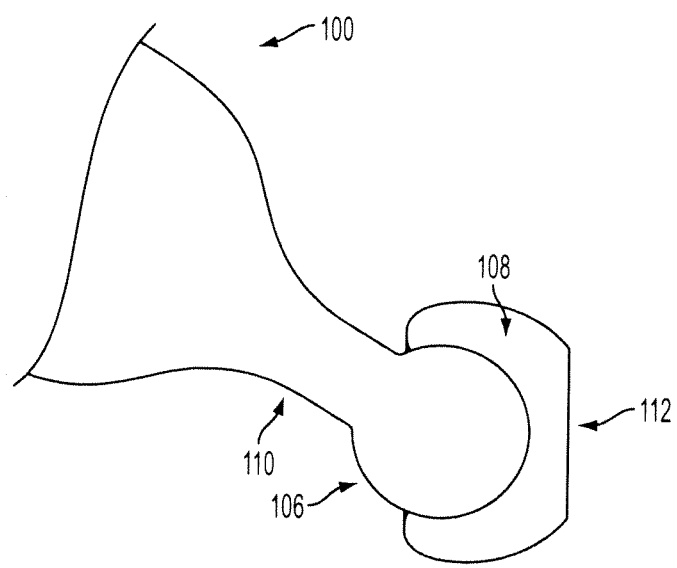
FIG. 1B illustrates a cross-section of the exemplary stylus of FIG. 1A.

With reference to FIG. 1B, the tip 108 may be attached to head 106 and may be movable relative to the tip 108. In this example, the tip 108 may be rotated relative to the body 102. The tip 108 may be attached to body 102 by press-fitting the tip 108 onto a ball-shaped portion of the head 106.

The body 102 and the tip 108 may both be formed from a conductive material so that, in use, a conductive path may be provided from the capacitive touch position sensor to the hand of the stylus user such that the stylus 100 may be connected to ground through the hand of the stylus user. Exemplary conductive materials for forming the tip 108 and the body 102 include metals, metal alloys and conductive polymers. Examples of conductive metals may be aluminum, titanium, chromium, iron, nickel, copper, zinc, palladium, silver, platinum and gold. Examples of metal alloys may be brass, steel and bronze. Examples of conductive polymers include carbon-filled polytetrafluoroethylene (PTFE) and acetyl ELS. A body 102 or tip 108 formed from a conductive polymer may be formed by injection molding.

In some examples, the body 102 and the tip 108 may be formed from the same material. In other examples, the body 102 and the tip 108 may be formed from different materials.

In some examples, the stem 104 may be cylindrical. In the example shown in FIG. 1A, the stem 104 may have a length of about 100 mm and a diameter of about 6 mm. In other examples, the stem may have any shape and/or dimensions that allow the stem to be held by a user.

In some examples, stem 104 may have a neck 110 connected to a ball-shaped head 106. In the example shown in FIG. 1B, the neck 110 is narrower than the rest of the stem 104. In other examples, the part of the stem 104 that is connected to the head 106 may have a similar diameter as any other part of the stem 104. In the example shown in FIG. 1B, the head 106 may be substantially spherical. In other examples, the head may have another shape that allows movement of the tip 108 relative to the head 106. For example, the head 106 may be substantially oval in shape.

The internal surface of the tip 108 may be of similar shape as the surface of the head 106 in order that the tip 108 may conform to the head 106, but move freely relative to the head 106.

The external surface of the tip 108 may have at least one substantially flat portion 112. In use, the stylus 100 may be arranged such that the flat portion 112 may be in contact with a surface of a capacitive touch position sensor. In this example, the flat portion 112 may remain in contact with the sensor surface during lateral movement of the stylus 100 across the sensor surface and/or during rotation of the body 102 relative to the tip 108.

The flat portion 112 may be differentiated from the remainder of the tip 108, such as by use of a color on part or all of the flat portion 112 different than a color of the rest of the external surface of tip 108. By differentiating the flat portion 112 from the tip 108, easy visual identification of that flat portion 112 by a user allows the user to quickly position the stylus 100 such that the flat portion 112 may be quickly and easily placed on the surface of the touch screen during use.

The tip 108 may be formed from a material having a low friction surface, such as a conductive polymer. Low friction at the flat portion 112 of tip 108 may provide low resistance to movement of stylus 100 along a surface of a capacitive touch sensitive panel. Likewise, low friction at the interior surface of tip 108 may provide low resistance to movement of the tip 108 relative to the head 106. In addition, manufacturing the remainder of the tip 108 with a low friction material may significantly reduce the potential for scratching the surface of the touch screen from inadvertent rough touching of the tip to the touch screen.

Figure 1C:
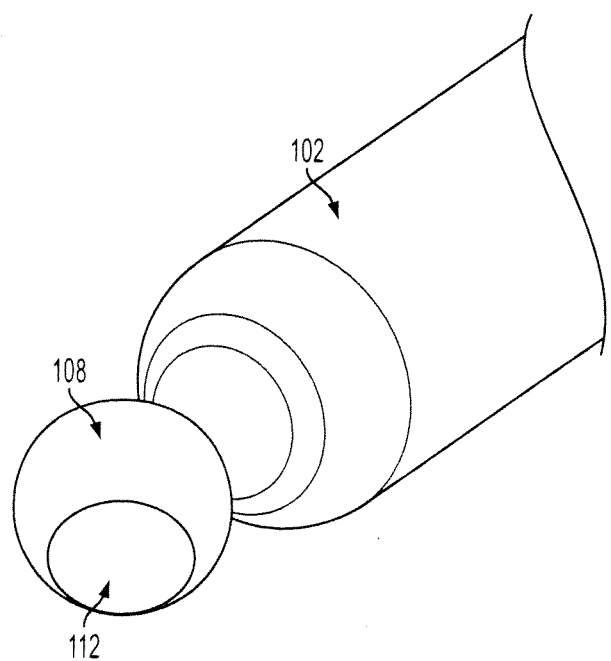
FIG. 1C is a schematic illustration of a tip of the exemplary stylus of FIG. 1A.

As illustrated in FIG. 1C, the flat portion 112 of the tip 108 may be circular. In other examples, the flat portion may have a non-circular shape. The width of the widest point of the flat surface of tip 108 may range from, for example, about 0.5 mm to about 6 mm. For example, in FIG. 1C, the widest point is the diameter of the circular flat portion 112.

Because the stylus 100 has a movable tip 108, a user may hold or move the stylus 100 at different angles relative to a flat screen. For example, as a user moves the stylus 100 across a flat screen, the angle between the linear axis of the stylus 100 and the flat screen may change. The movable tip 108 may allow for the flat portion 112 to maintain a constant contact with the surface of a flat screen. In addition, because the tip 108 has a flat portion 112, the tip may maintain a larger contact area with the flat screen than a conventional stylus that does not have a flat portion on the tip.

With reference to FIG. 1A, the body 102 may be rotated relative to the tip 108 down to a minimum angle $\theta$ between the plane of the flat portion 112 and the linear axis of the body 102, at which point neck 110 makes contact with the rim of the internally recessed portion of the tip 108. In some examples, the minimum angle $\theta$ may be about 45 degrees. The width of neck 110 may affect the value of minimum angle $\theta$, and in particular, a narrower neck may allow a smaller minimum angle $\theta$.

Figure 1D:
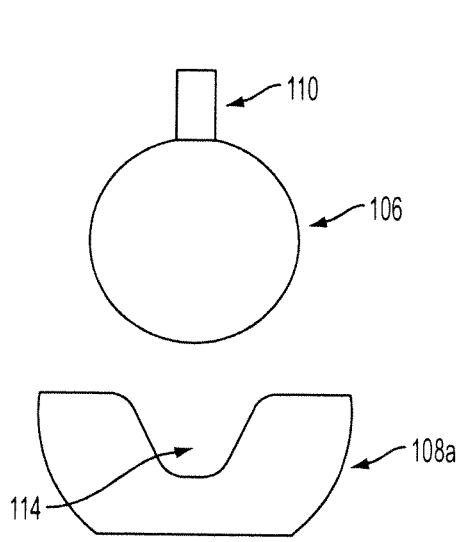
FIG. 1D illustrates a cross-section of a tip of the exemplary stylus of FIG. 1A.
Figure 1E:
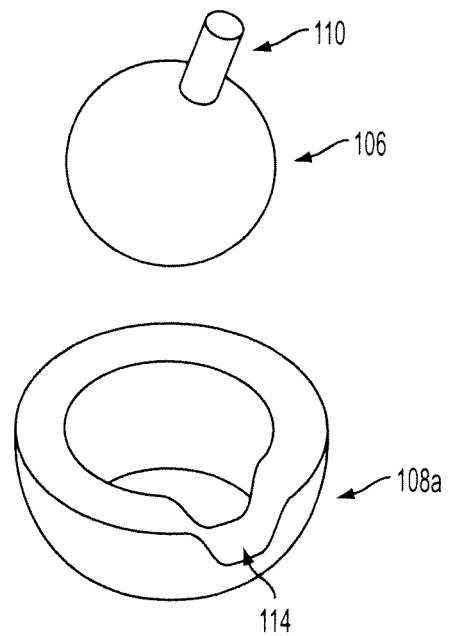
FIG. 1E illustrates an elevated view of a tip of FIG. 1D.

FIGS. 1D and 1E illustrate another arrangement in which a tip 108a may be provided with a lateral recess 114 for receiving neck 110. If rotated in a direction so the neck 110 enters the recess 114, the recess 114 may allow the body 102 to rotate relative to the tip 108 to an angle smaller than minimum angle $\theta$ illustrated in FIG. 1A. More than one recess 114 may be provided in tip 108a to allow the body 102 to rotate to a small angle in more than one direction.

Figure 2:
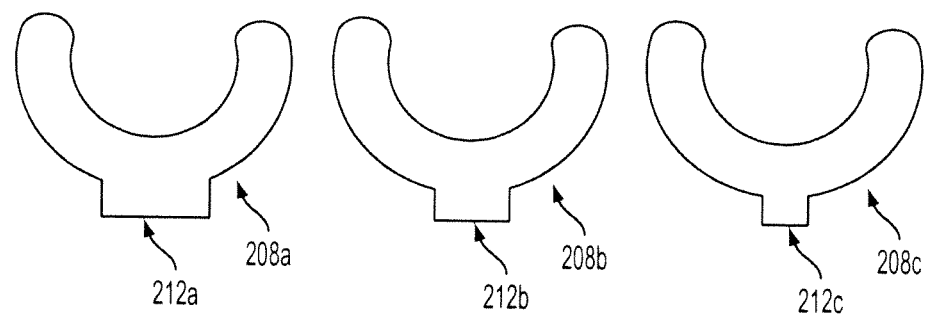
FIG. 2 illustrates a cross-section of a number of caps suitable for use as components of an exemplary stylus.

The tip may be detachable from the head, in which case a number of interchangeable tips may be provided. FIG. 2 illustrates some tips 208a, 208b and 208c that may have similar dimensions and that may be useable with a single body, but that may have different sized and shaped flat portions 212a, 212b and 212c. A tip may be selected from the number of interchangeable tips 108, 108a, 208a, 208b and 208c for use in a specific capacitive touch position sensor application and/or according to sensitivity of the sensor to a touch.

As can be seen in FIG. 2, in some example, the tips 208a, 208b and 208c form protrusions that extend out from the tips 208a, 208b and 208c to form flat portions 212a, 212b, and 212c having various widths. In other examples, such as those shown in FIG. 1B, the flat portion 112 is formed as a cut along a plane of the curved tip 108. The width of the flat portion may be controlled by varying the amount of the curved tip 108 that is cut.

In one arrangement, the body 102 may be a unitary structure. In another arrangement, the body 102 may be a modular structure formed from two or more connectable modules. For example, the head 106 may be screwed onto the stem 104. In the examples where the head 106 may be detachable from the stem 104, a number of interchangeable heads may be provided. The interchangeable heads may be of similar size and shape. In other examples, the heads may differ in size or shape of one or more of the head 106 and the tip 108 to suit different needs of the user and/or to facilitate use with different touch screen panels.

Figure 3A:
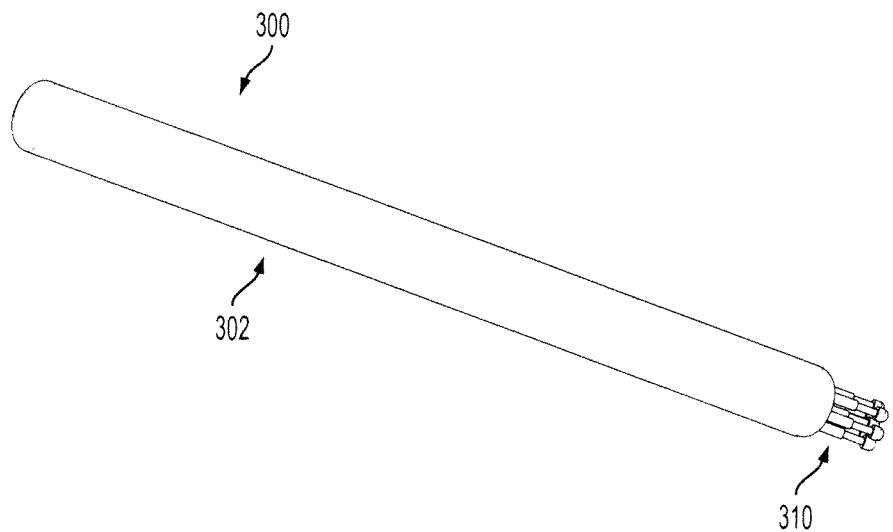
FIG. 3A illustrates schematically another exemplary stylus.
Figure 3B:
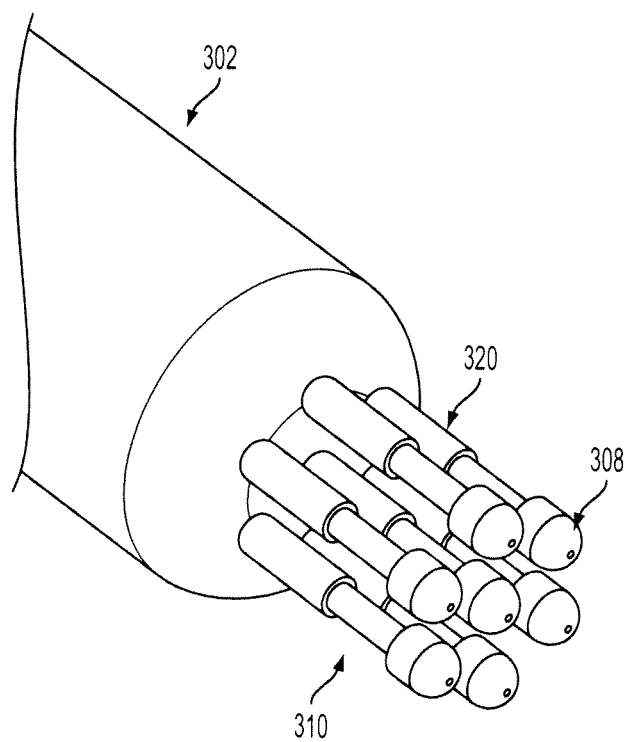
FIG. 3B illustrates schematically an end of the exemplary stylus of FIG. 3A.

FIGS. 3A and 3B illustrate another exemplary stylus 300 for a touch screen. The stylus 300 may be formed of an elongated body 302 and pins 310 at an end of the body that together provide a tip 308 of the stylus 300.

Each pin 310 may be housed in a recess of the body, and each pin 310 may be individually moveable relative to the body 302. In this example, each pin 310 may be moveable relative to the body substantially along the body axis. The number of pins 310 on the stylus 300 may be any number that may be placed on the end of the stylus 300. In some examples, the number of pins 310 may be three. In the exemplary stylus shown in FIG. 3B, the number of pins 310 is seven. In other examples, the number of pins 310 may be as high as 30. In use, the tips 308 of the pins 310 contact the surface of a capacitive touch position sensor. The surface area of each tip 308 where a pin 310 comes into contact with the sensor may be in the range of 0.5-2 mm, and this surface may be smooth such that there is no significant frictional resistance to lateral movement of the pin 310 across a sensor surface and to avoid damage to the sensor surface during such lateral movement.

The stylus 300 illustrated in FIGS. 3A and 3B may have a cylindrical body 302. As in the earlier examples, the body may have any shape or dimensions that allow the body to be held by a user.

Figure 3C:
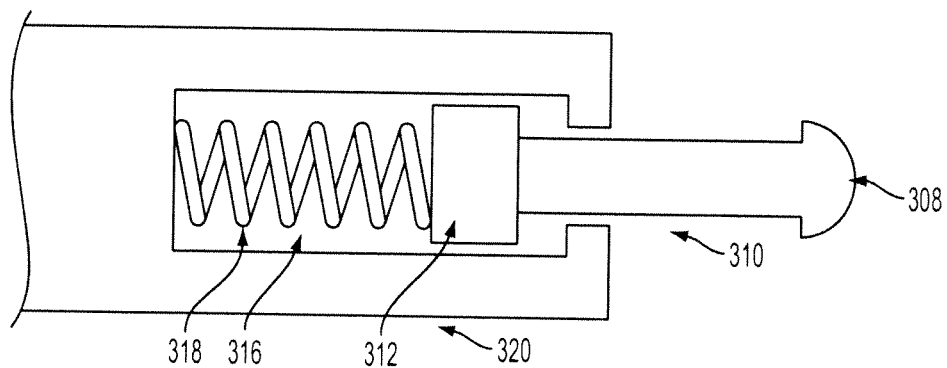
FIG. 3C illustrates a cross-section of an exemplary pin of a stylus.

FIG. 3C illustrates a cross-section of an example of an individual pin 310. At a distal end of the pin 310 is the tip 308. At a proximal end of the pin 310 is a base 312 which may be in contact with a spring 318 formed from a conductive material, such as a metal or metal alloy. The base 312 may be located within a holder 320 having a recess 316 attached to the body 302. A part of the pin 310 within the recess 316 may be dimensioned so as to prevent the pin from falling out of the holder 320. In this example, the base 312 of the pin 310 may be wider than the rest of the pin 310. Any part of the pin 310 that is within the holder 320 when the spring 318 is uncompressed may be dimensioned to prevent the pin from falling out of the holder 320. In other examples, the pin 310 may be held in the holder 320 by attachment to spring 318, which in turn may be attached to an interior surface of the holder 320. In other examples, the spring may include a tip fixed to the end of the spring 318 which extends out from the holder 320.

The body 302, the holder 320, the pins 310 and the spring 318 may be formed of a conductive material. Exemplary conductive materials include metals, metal alloys and conductive polymers.

When not in use, pin 310 may be biased away from body 302 and extending out of the holder 320 by spring 318. In use, the number of pins 310 may be pressed against the surface of a capacitive touch position sensor. Depending on the pressure applied by the stylus user, the angle of pressure relative to the sensor surface and the shape of the surface of the sensor, some or all of the springs may be compressed. At non-perpendicular angles relative to the sensor surface, one or more springs 318 may be compressed by a different amount such that the tip 308 of each pin 310 is in contact with the sensor surface. The conductivity of the body 302, the holder 320, the pins 310 and the springs 318 allows formation of a connection to ground through the user's hand.

In use of stylus 300, the degree of compression of each individual pin may depend on the angle at which the stylus 300 makes contact with the surface of the sensor, and whether the sensor has a flat or a curved surface. The total contact area of tip 308 and the surface of the sensor may remain substantially constant regardless of the angle at which the stylus 300 contacts the sensor surface and/or regardless of whether the stylus 300 is in contact with a flat or curved sensor surface.

The styluses described herein may be used with any capacitive touch position sensor. Exemplary touch sensors include self-capacitance and mutual capacitance touch sensors.

Figure 4:
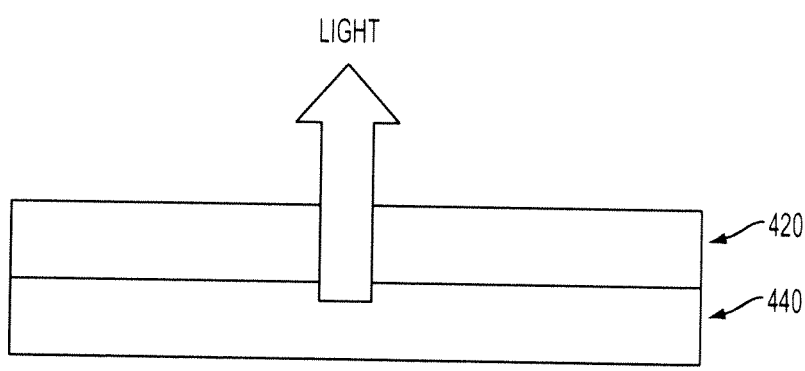
FIG. 4 illustrates an exemplary capacitive touch position sensor and display.

FIG. 4 illustrates a capacitive touch position sensor 420 suitable for use with any stylus described herein overlying a display 440. The capacitive touch position sensor 420 may be configured to detect the presence and location of a touch by the stylus. The stylus may be used to touch individual points on a capacitive touch screen or to draw or write on the capacitive touch screen.

In use, light emitted from the display 440 may be transmitted through the capacitive sensor towards a user. Exemplary displays for use with capacitive sensor 440 include, without limitation, liquid crystal displays, electronic ink displays, organic light-emitting displays, plasma and cathode ray tube displays.

The capacitive touch position sensor suitable for use with a stylus described herein may be used with computers, personal digital assistants, satellite navigation devices, mobile telephones, portable media players, portable game consoles, public information kiosks, point of sale systems, and control panels on appliances.

Various modifications may be made to the examples described in the foregoing, and any related examples may be applied in numerous applications, some of which have been described herein. It is intended by the following claims to claim any and all applications, modifications and variations that fall within the true scope of the present disclosure.

The invention claimed is:

1. A stylus comprising:
   an elongated body for manipulation by a hand of a user;
   a head connected to the body;
   a tip movably attached to the head; and
   a neck that couples the head of the stylus to the body of the stylus,
   wherein:
     the tip has a flat portion for contacting a surface of a touch screen,
     the head, the body, and the tip are electrically conductive, and
     the tip of the stylus comprises a recess in a lip of the tip, the recess adapted to receive the neck when the stylus is rotated to an appropriate angle.

2. The stylus of claim 1, wherein the tip is comprised of a conductive plastic.

3. The stylus of claim 1, wherein the flat portion has a circular perimeter.

4. The stylus of claim 1, wherein the flat portion of the tip has a diameter of about 2 mm to about 4 mm.

5. The stylus of claim 1, wherein the head is comprised of a different material than the tip.

6. The stylus of claim 5, wherein the head is comprised of metal, and the tip is comprised of a conductive plastic.

7. The stylus of claim 1, wherein the tip is removable from the head.

8. The stylus of claim 1, wherein the head is ball-shaped, and the tip has an inner surface for coupling with a portion of the ball-shaped head.

9. The stylus of claim 1, wherein the tip is rotatable about a linear axis of the body.

10. A stylus comprising:
    an elongated body for manipulation by a hand of a user having a linear axis; a plurality of holders attached to an end of the body; a plurality of linearly-shaped pins arranged inside the plurality of holders at the one end of the body, wherein each pin has a linear axis parallel to the linear axis of the body, wherein each pin is movable along the linear axis relative to the body such that the distance that each pin extends from a respective holder is adjustable in response to contact pressure, and the tip of each pin has a curved, convex surface.

11. The stylus of claim 10, wherein the body and the pins are comprised of a conductive material.

12. The stylus of claim 10, wherein the body is comprised of a different material than the pins.

13. The stylus of claim 11, wherein the body is comprised of metal, and the pins are comprised of a conductive plastic.

14. The stylus of claim 10, wherein an outline around the tips of each of the pins is circular.

15. The stylus of claim 10, wherein the stylus has at least three of the linearly-shaped pins.

16. The stylus of claim 10, wherein each tip is comprised of a conductive plastic.

17. The stylus of claim 10, wherein each pin extends from each respective holder via a compressive force of a spring located in a recess of the respective holder between the pin and the body.

18. The stylus of claim 1, wherein the flat portion of the tip has a diameter of about 0.55 mm to less than 4.445 mm.

19. The stylus of claim 1, wherein a diameter of the flat portion of the tip is smaller than a diameter of at least one other portion of the tip across a plane that is parallel to a plane of the flat portion of the tip.

* * * * *